July 31, 1923.
E. D. ANDERSON ET AL
1,463,454
BOX MAKING MACHINE
Filed May 19, 1921.
8 Sheets-Sheet 8
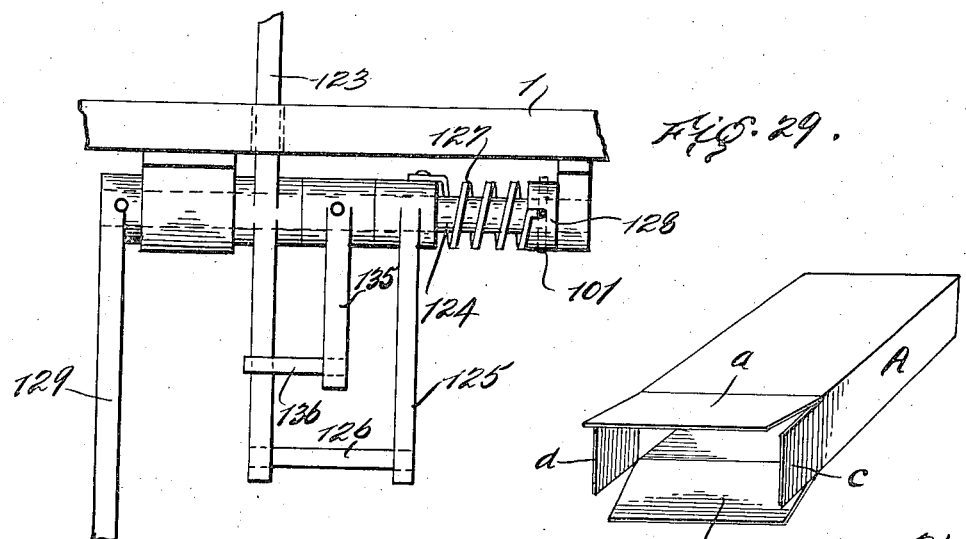
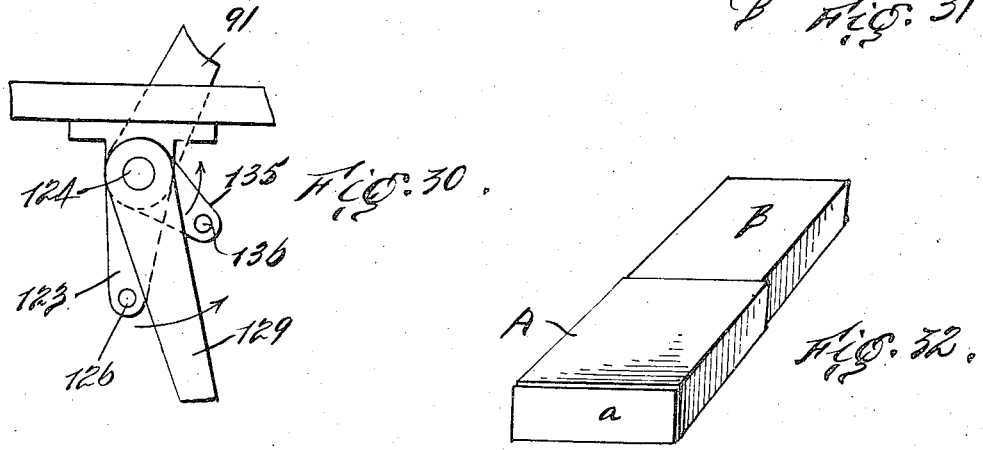
Inventor
E. D. Anderson & C. Beckmann
By their Attorney
T. F. Bourne Patented July 31, 1923.

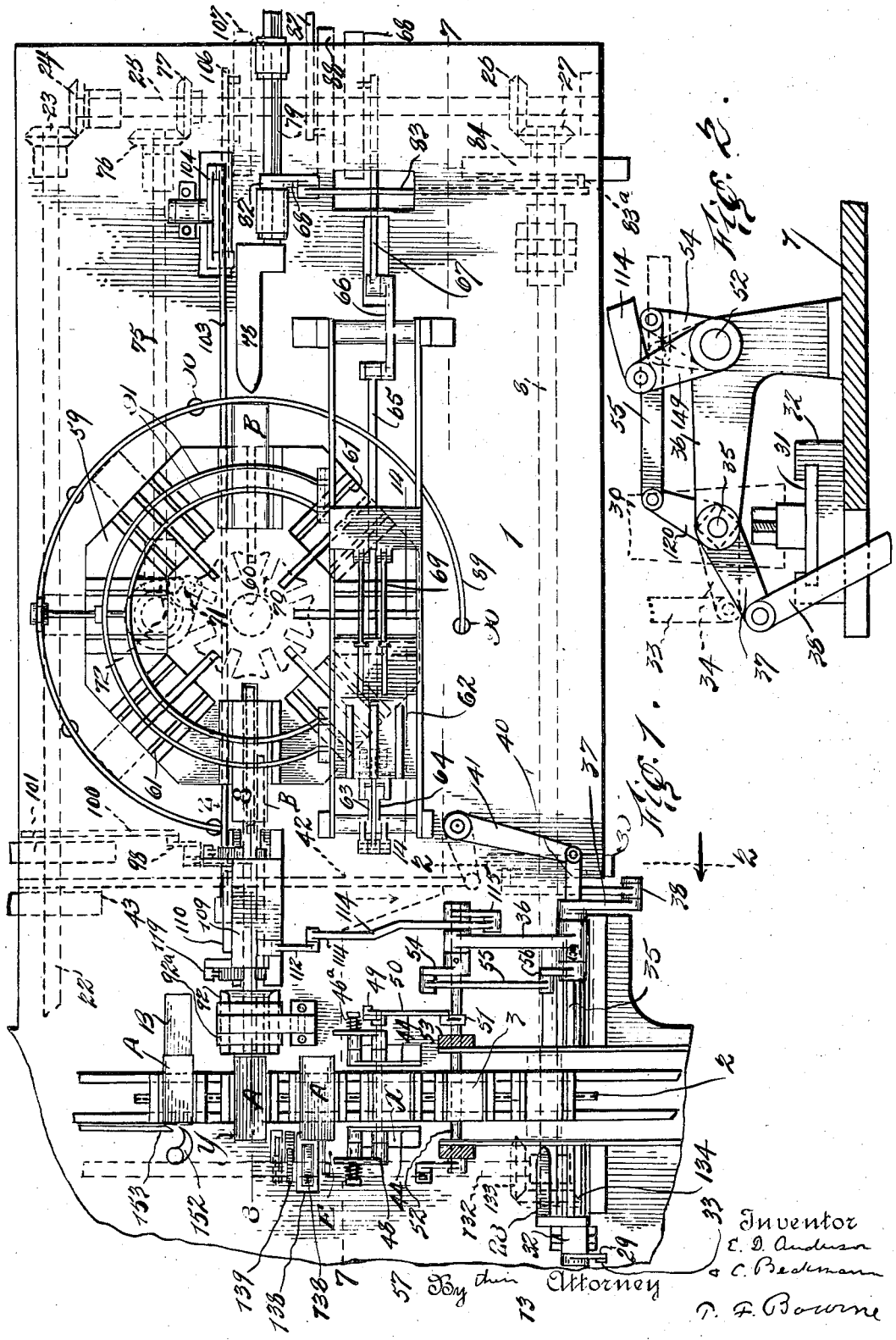

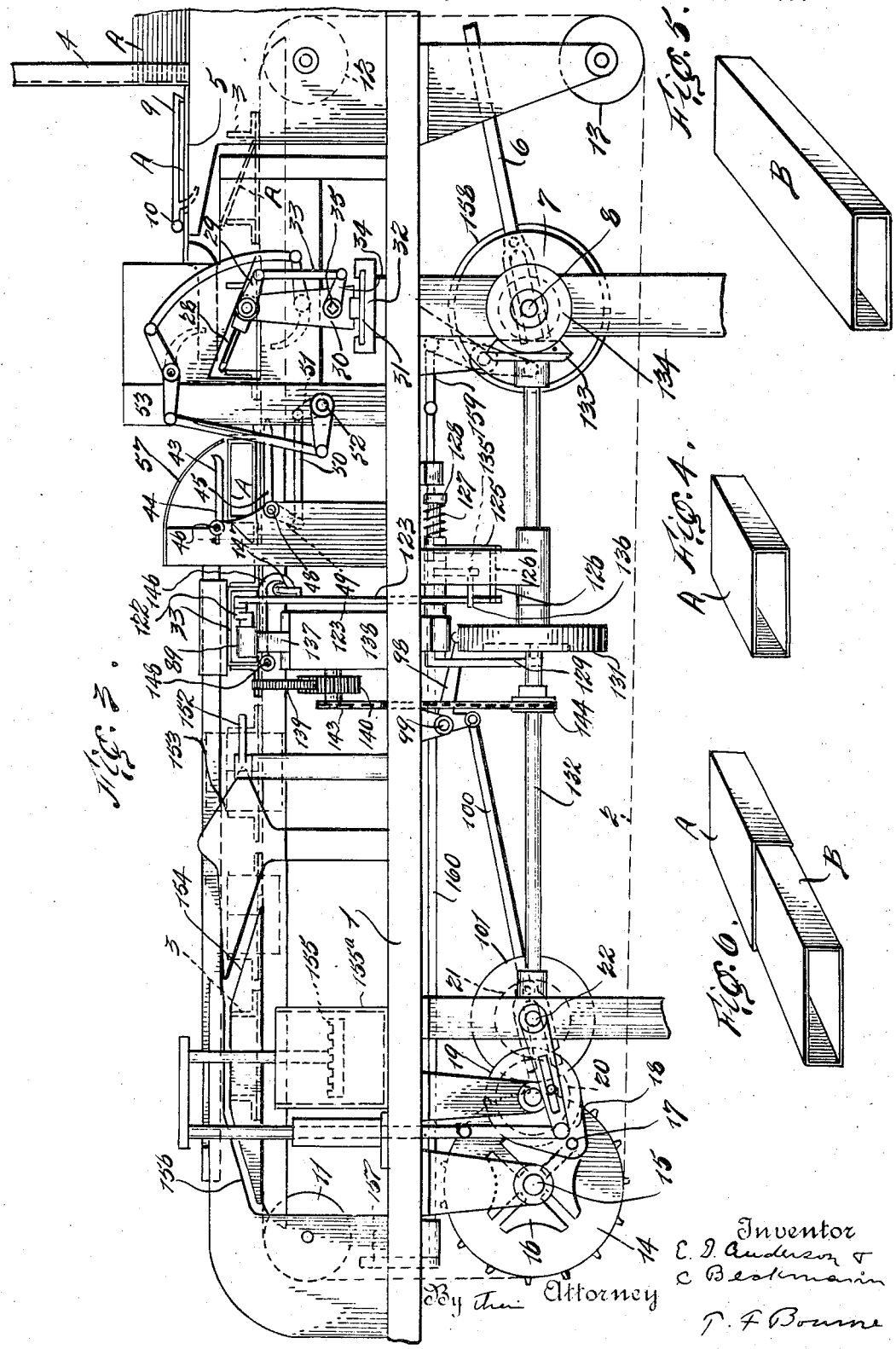

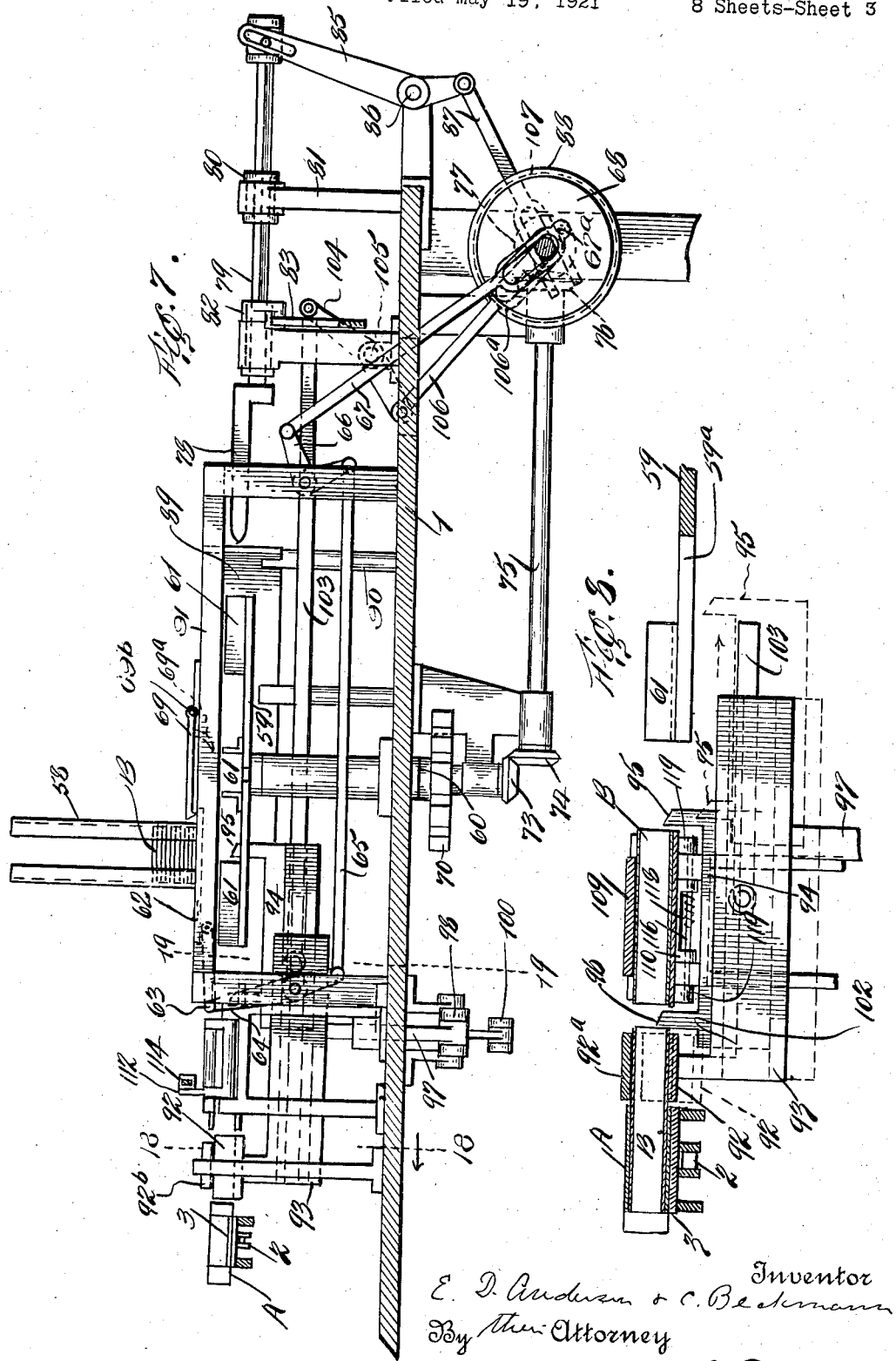

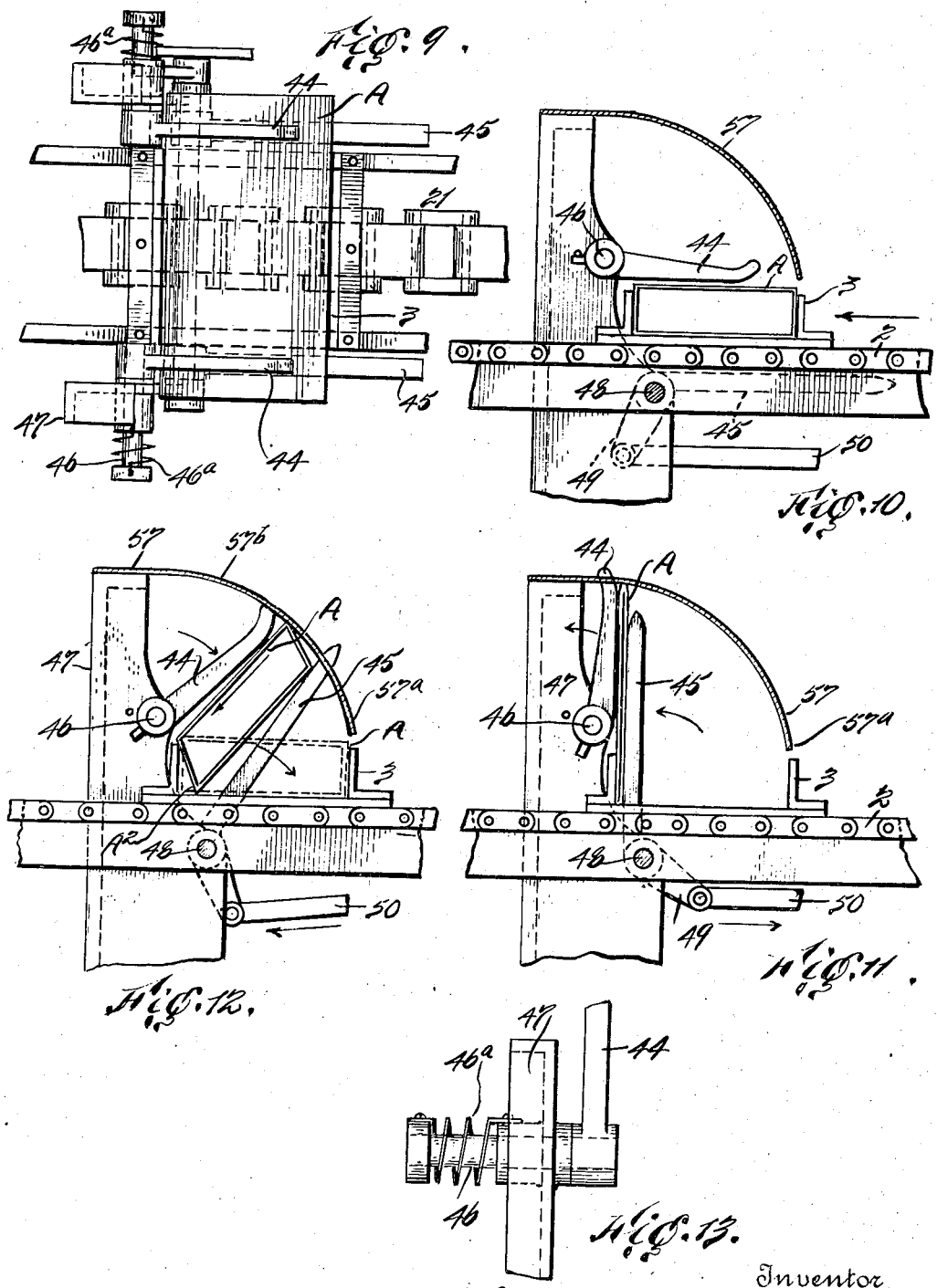

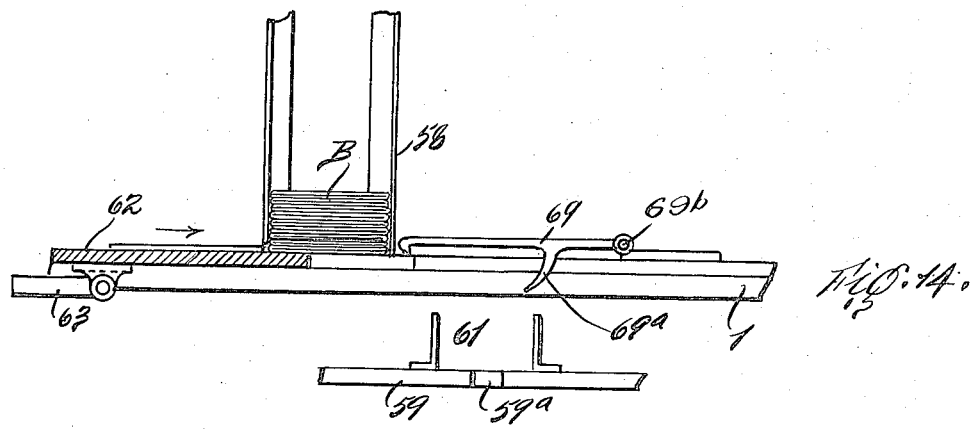
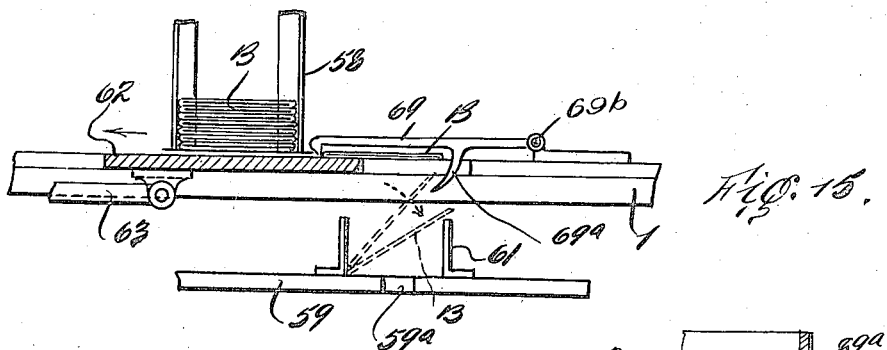
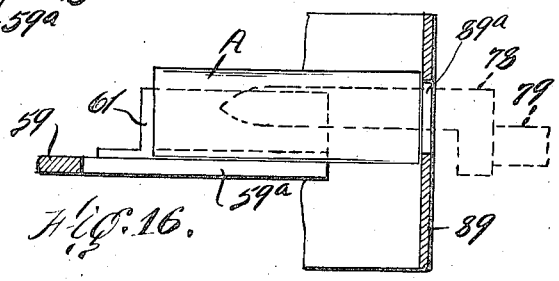
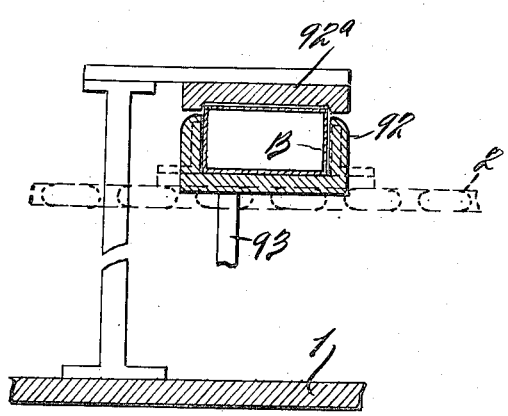

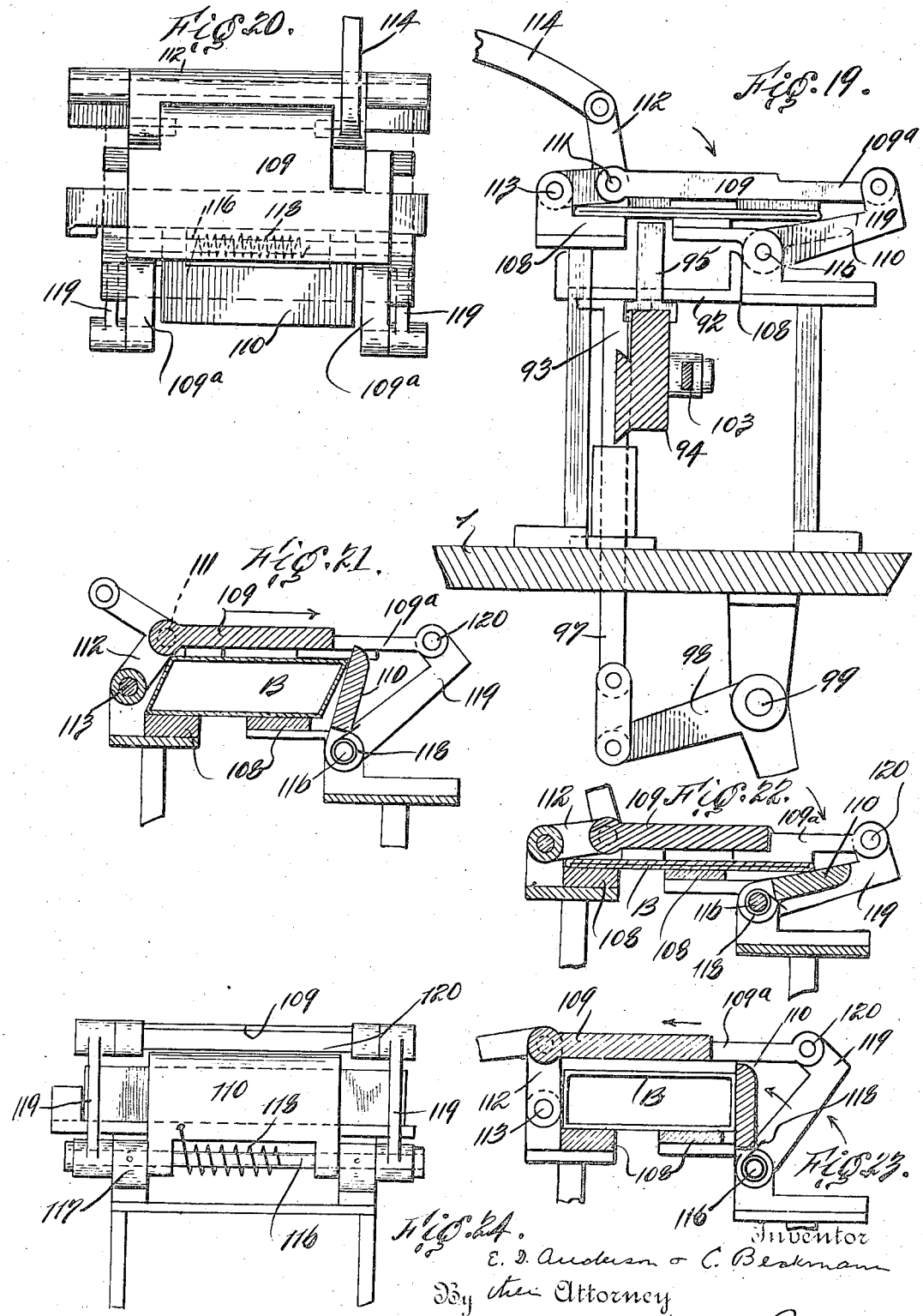

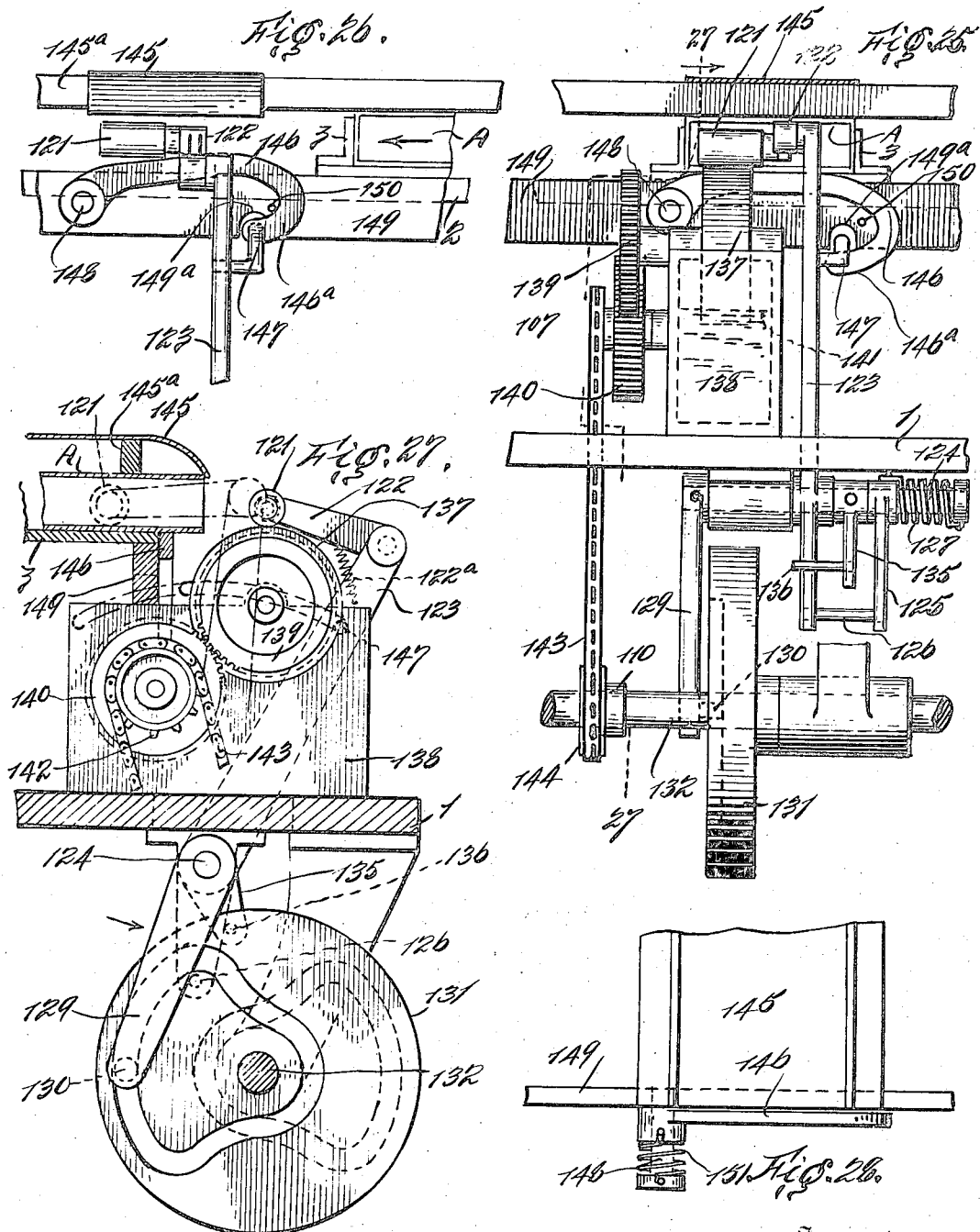

1,463,454

UNITED STATES PATENT OFFICE.

ERNEST D. ANDERSON AND CARL BECKMANN, OF NEW YORK, N. Y., ASSIGNORS TO E. D. ANDERSON, INC., OF NEW YORK, N. Y., A CORPORATION OF NEW YORK.

BOX-MAKING MACHINE.

Application filed May 19, 1921. Serial No. 470,935.

*To all whom it may concern:*

Be it known that we, ERNEST D. ANDERSON, a citizen of the United States, and resident of New York city, borough of Manhattan, county and State of New York, and CARL BECKMANN, a subject of Germany, and resident of New York city, borough of Queens, State of New York, have invented certain new and useful Improvements in Box-Making Machines, of which the following is a specification.

This invention relates to machines for assembling box members together, such as an outer member and an inserted member, such as boxes for containing pencils wherein the inserted member is longer than and projects from the outer member.

This invention comprises means to supply and open the outer and inner box members, to deform the opened squared box members and resquare them, to insert the inner member within the outer member, and deliver the assembled box parts.

The invention further comprises novel details of improvement and combination of parts that will be more fully hereinafter set forth and then pointed out in the claims.

Reference is to be had to the accompanying drawings forming part hereof, wherein—

Figure 1 is a plan view of a portion of a machine embodying this invention; Fig. 2 is a detail section substantially on the line 2, 2 in Fig. 1; Fig. 3 is an end view looking from the left in Fig. 1; Figs. 4, 5 and 6 illustrate members of the box; Fig. 7 is a section substantially on the line 7, 7 in Fig. 1; Fig. 8 is a section on the line 8, 8 in Fig. 1; Fig. 9 is a plan view of devices for deforming and re-squaring box body members; Figs. 10, 11 and 12 are sections of Fig. 9, showing parts in different positions of operation; Fig. 13 is a detail of part of Fig. 9; Figs. 14 and 15 are sections substantially on line 14, 14 in Fig. 1, showing parts in different positions; Fig. 16 is a detail section illustrating part of the turret; Fig. 17 is an edge view of part of the turret; Fig. 18 is a section on line 18, 18 in Fig. 7; Fig. 19 is an enlarged section substantially on line 19, 19 in Fig. 7; Fig. 20 is a detail plan view of Fig. 19; Figs. 21, 22 and 23 are detail sections of parts shown in Fig. 19 in different positions of operation; Fig. 24 is an end view looking from the right in Fig. 23; Fig. 25 is an enlarged side view of part of Fig. 3; Fig. 26 is a detail of parts shown in Fig. 25; Fig. 27 is a section substantially on the line 27, 27, in Fig. 25; Fig. 28 is a detail plan of part of Fig. 26; Fig. 29 is an enlarged detail of part of Fig. 25; Fig. 30 is a detail edge view of Fig. 29; Fig. 31 is an end view of the outer box body before its end flaps are closed, and Fig. 32 is a detail perspective of the assembled box parts looking from the end opposite that shown in Fig. 6.

Similar numerals of reference indicate corresponding parts in the several views.

The numeral 1 indicates the main frame of the machine, which may be of any suitable construction. A conveyer for the outer box bodies A is indicated at 2. Said conveyer is shown in the form of an endless chain having receivers 3 for said box bodies suitably spaced apart, said receivers being shown open on top to receive said bodies. The collapsed box bodies A are supplied in a magazine 4 supported in suitable manner upon frame 1 and which may be of well known character to permit the lowermost box body to be removed therefrom, Fig. 3. A slide 5 reciprocates under the magazine to feed the box bodies A successively to the receivers 3 of the conveyer. Slide 5 may be connected in any well known manner with a link 6 actuated by a cam 7 carried by shaft 8, journaled upon the main frame. The construction described may be similar to that shown in Letters Patent granted to me, No. 1,313,974, dated August 26, 1919.

A hook member 9 pivoted upon the main frame at 10 is adapted to engage the bodies A as fed from the magazine by feeder 5 to cause said bodies to be released to drop into the receivers 3 in a well known manner, Fig. 3. The conveyer is operated step by step and is shown carried by idle wheels 11, 12, 13, and by drive sprocket 14, journaled upon the main frame. The shaft 15 of sprocket 14 is shown provided with Geneva member 16 operated by a projection 17 on an arm 18 carried by shaft 19 supported by the main frame, said shaft having a gear 20 in mesh with gear 21 carried by shaft 22, journaled on the main frame; (Fig. 3). Shaft 22 has a gear 23 in mesh with gear 24 on shaft 25 journaled on the main frame, Fig. 1. Shaft 25 has a gear 26 in mesh with gear 27 on shaft 8. The collapsed box bodies A are opened, squared and seated in the receivers 3 by means of an opener blade 28. Opener 28 is carried by a rock-arm 29 rotatively supported by a head 30 having a sliding foot 31 slidably carried in a slide rest 32 supported by the main frame, Figs. 1, 2 and 3. Arm 29 is connected by link 33 with an arm 34 secured upon a square or angular shaft 35 journaled in bracket 36 on the main frame. Shaft 35 carries an operating arm 37 connected by link 38 with cam 39 on shaft 8, Figs. 1 and 2. Slide 31 is reciprocated to insert blade 28 into and withdraw it from box bodies A by means of link 40 pivotally connected to said slide and to arm 41, being actuated by link 42 controlled by cam 43 on shaft 22, Fig. 1. Each time the conveyer comes to rest opener 28 is advanced into box bodies A on the conveyer, said opener then being rocked to open and square said body in its receiver and the opener is then moved out of the box body ready for similar operations successively, for the succeeding box bodies. Although a particular means has been described for opening the box bodies in the receivers any other suitable means for the purpose may be utilized.

After the box bodies have been opened in the receivers said bodies are brought to rest in position to be deformed and re-squared. In other words, to break down the box sides and reshape them so that the box body will have a tendency to spring out of normal shape or the shape in which it is squared in its receiver. At the position X, Figs. 1 and 9 to 12, the box body is brought to rest between spaced upper fingers 44 and spaced lower fingers 45, located on opposite sides of the conveyer, adapted to engage the end portions of the box bodies. The upper fingers 44 are carried by shaft 46 journaled upon a housing or frame 47, which shaft is normally actuated by springs $46^a$ to cause said fingers to bear upon box bodies A, Figs. 9 and 13. Housing or frame 47 is supported upon main frame 1, Fig. 3. Fingers 45 are carried by shaft 48 journaled under the upper run of the conveyer and having a crank arm 49 connected by link 50 with crank arm 51 secured on shaft 52, journaled upon uprights 53 on the main frame, Fig. 3. Shaft 52 has an arm 54 connected by link 55 with arm 56 carried by shaft 35, whereby shaft 52 will be rocked in unison with shaft 35. When a box body A comes to rest between fingers 44 and 45, (Fig. 10), link 50 will be operated to cause fingers 45 to push against the box body to squeeze or compress the same against the resistance of spring-acting fingers 44, (Fig. 11), the eccentric pivoting of the fingers aiding in the operation, whereby the creases at the corners of the box body are distorted. When link 50 moves in the opposite direction the fingers 45 will be depressed and fingers 44, due to the action of springs $46^a$, will cause the box body to be restored to the square position in receiver 3, (see dotted lines in Fig. 12.) Curved plate 57, at station B, extends over the box body A between the pairs of fingers 44, 45. The plate 57 is eccentric to the path of body A when moved by said fingers, the part $57^a$ of plate 57 being closer to the pivotal point $A^2$ of body A than the part $57^b$ of said plate, so that on the upward movement of the box body the latter may close (Fig. 11) and on the downward movement the body will open as it is crowded by plate 57 in receiver 3.

The box body A is brought to rest by the conveyer in an open condition at the station Y, (Fig. 1) in position to receive the inner box body or insert B which, in the example illustrated, is longer than the body A, adapted to contain pencils. The body inserts B are supplied in collapsed condition in a magazine 58 supported by the main frame above a turret 59 carried by a vertical shaft 60 journaled on the main frame, (Figs. 1 and 7). The turret is provided with receivers 61, shown open on top, to receive the body inserts B. The body inserts may be fed to the receivers of the turret successively in any suitable manner. For such purpose a reciprocative plate 62 is guided over one side of the turret and is operated by link 63 pivotally connected with lever 64 supported by the main frame and pivotally connected with link 65 that is pivotally connected with bell crank 66 shown journaled in an upright on the main frame and pivotally connected with link 67 operated by cam 68 on shaft 25, by means of projection $67^a$ on said link, (Figs. 1 and 7). As said plate 62 carries the lowermost body B from under the stack in magazine 58 said body will be engaged by hook 69, pivotally supported at $69^b$, which hook is provided with a prong $69^a$ to stop the movement of body B (Fig. 15). When feed plate 62 returns the body insert B will drop into a receiver 61 on the turret below, (Fig. 15). Turret 59 is rotated step by step in consonance with the step by step operation of conveyer 2. The shaft 60 is shown provided with the slotted member 70 of a Geneva movement that is adapted to be engaged by a projection on an arm 71 journaled on the main frame at 72, the shaft of said arm having a gear 73 in mesh with a gear 74 on shaft 75 journaled on the main frame and having a gear 76 in mesh with gear 77 on shaft 28 (Figs. 1 and 7). While shaft 25 is rotated the arm 71 will be rotated to cause intermittent rotation of Geneva member 70 and turret 59. The turret comes to rest with a collapsed box insert B opposite an opener 78 that is adapted to enter the insert B, open it and seat it in the receiver 61, (Fig. 16). The opener 78 is carried by a longitudinally movable shaft 79 journaled in bearings 80 rotative on supports 81 on the main frame, so that said shaft may be rocked. Shaft 79 is slidable in an arm 82 (Figs. 1 and 7) that is connected with link 83 operated by a cam 84 on shaft 8, said link being guided by said shaft and provided with a projection 83ª to be actuated by cam 84, (Fig. 1), whereby shaft 79 is rocked. Said shaft is movably connected with crank arm 85 pivoted at 86 on the main frame and connected with link 87 that is shown forked and guided by shaft 25, (Fig. 7). Link 87 has a projection engaging cam 88 on shaft 25. Cams 84 and 88 are so arranged that shaft 79 will be operated to insert opener 78 into the box insert B on the turret, and when the opener is within the box the cam 84 will cause shaft 79 to rotate to swing the opener within the insert B to open and square the latter in the receiver of the turret, and shaft 79 then will be moved outwardly to withdraw the opener from the open body insert.

The turret comes to rest with opened body inserts B at station Z in register with open box bodies A at station Y for insertion of the inserts B into the bodies A, (Fig. 1). As the turret is rotated the body inserts B, at their outer ends, engage a curved guide 89 disposed annularly around the turret, to present the inserts properly at station Z. The guide 89 is shown supported by posts 90 on the main frame (Figs. 1 and 7). Guide 89 is provided with a hole 89ª to receive opener 78 (Fig. 16). Circular guides 91 supported over the turret keep the inserts B in the receivers 61, (Fig. 1).

Means are provided to squeeze or distort the inserts B and retore them to square condition before they are inserted in the bodies A. At the station Z the inserts B are removed from the receivers 61 of the turret and inserted in guide 92, between which guide and the turret devices are located to squeeze or distort the inserts B. Guide 92 is shown open on top (Fig. 18) and carried upon a movable support 93 that slidably carries an ejector 94 provided with upwardly extending spaced fingers 95, 96, (Figs. 7, 8, and 19). A stop 92ª is supported over guide 92 to limit upward movement of body insert B. The support 93 is supported and reciprocated vertically by means of a post 97 operated by a lever 98 pivotally supported on the main frame at 99 (Fig. 19) and pivotally connected with link 100, which link is operated by cam 101 on shaft 22, (Figs. 1 and 3). Since the body member A extends beyond the receiver 3 and since the finger 95 is adapted to enter radial slots 59ª in turret 59 the support 93 will be depressed by the operation of cam 101 while conveyer 2 and the turret are being operated. When the conveyer and turret come to rest support 93 will rise to present guide 92 in register with the receiver of the conveyer and to permit finger 95 to enter slot 59ª of the turret, said slots extending through the receivers 61 to the periphery of the turret (Fig. 8). Fingers 95, 96, carried by ejector 94 slidably guided by support 93, are raised and lowered with said support, (Figs. 3, 7, 8 and 19). Member 94 is connected with a rod or link 103 that is pivotally connected with lever 104 journaled at 105 on the main frame and connected with link 106, (Figs. 1 and 7). Link 106 is guided by shaft 25 by means of slot 106ª and is provided with a projection cooperative with a cam 107 on shaft 25, (Figs. 1 and 7). When support 93 is in the raised position cam 107 will cause ejector member 94 to move outwardly to feed inserts B from the turret, and to feed previously squeezed inserts from the squeezer devices to be described, through guide 92 into body A on the conveyer (Fig. 8), and when support 93 is depressed the member 94 will be withdrawn beneath the squeezing devices and the turret ready for another feeding operation.

The squeezing devices comprise spaced guides 108 (permitting the passage of finger 96, Figs. 8 and 19) upon which the inserts B may slide, a movable member 109 above said guides, and movable member 110 at one side of said guides, (Figs. 19–24). Member 109 is pivotally supported at 111 upon rock arm 112 that is pivotally supported at 113 adjacent to a guide 108, whereby member 109 may swing over and upon body insert B upon guides 108, (Figs. 19, 21, 22). Arm 112 is pivotally connected with link 114 that is pivotally connected with crank arm 115 secured on shaft 52 (Fig. 1), whereby as said shaft is rocked the member 109 also will be rocked over insert B on guides 108. The member 110 is pivotally supported upon shaft 116 journaled in bearings 117 adjacent to a guide 108, (Figs. 19 and 24). A spring 118 attached to shaft 116 and operating against member 110 causes said member resiliently to approach body insert B upon guide 108 (Figs. 23 and 24). Shaft 116 is provided with arms 119 that are shown pivotally connected at 120 with extensions 109ª of member 109. When the members 109 and 110 are at rest in normal position they are in rectangular relation to the guides 108 for reception therebetween of the squared body inserts B (Fig. 23). When member 109 is moved in the direction of the arrow in Fig. 21, it will correspondingly move arms 119 and member 110, and member 109 will bear upon the body insert, causing it to be flattened as illustrated in Fig. 22, the member 110 moving away from its normal position with arms 119. When the movement of member 109 is reversed the arms 119 will be moved back whereby member 109 will rise and member 110 will push body insert B back, by spring action, under member 109, so that when the parts are restored to the normal, or rectangular position the body insert B will likewise be restored to its square condition, (Fig. 23). The bending back and forth of the body insert walls, at the creases of the corners thereof, causes the insert to have a tendency to distort itself or spring out of normal rectangular condition. The body member A is distorted in one direction, as previously described, and the body insert B is distorted in an opposite direction, with the result that the tendency of said bodies when assembled one within the other will be to cause the walls of said members to hug each other by reason of the opposing transverse stresses, or the tendency to spring out of normal position imparted to them by the squeezing or distorting operations described. The pressure is accentuated by the members upon one another and the tendency to insure a tight fit when they are assembled one within another. After a body insert B has been squeezed or distorted, as described, it is fed from between the members 109 and 110, by the finger 96, through guide 92, into a box body A then at rest on conveyer 2 in register with said guide, and during such operation of finger 96 a body insert B will be fed by finger 95 from turret 59 into position between members 109 and 110 for a squeezing operation, (Fig. 8).

In case it is desired to cause adherence of the body members A, B, together, means are provided for applying adhesive to one of the body members before they are assembled. In the example illustrated conveyer 2 comes to rest with an opened body A in position to receive paste on its inner wall at the station E, (Fig. 1), before such body is brought to rest at the station Y to receive the body insert B. A paster 121, shown in the form of a roller, is carried by arm 122 pivotally supported by lever 123 loosely journaled upon shaft 124 journaled in bearings supported on the main frame (Figs. 3 and 25 to 28). An arm 125 is loosely mounted upon shaft 124 and is operatively connected with lever 123 by pin or connection 126. A spring 127, shown coiled around shaft 124, is secured at one end to arm 125 and at its other end to shaft 124, as by collar 128 on said shaft, (Fig. 25). Shaft 124 is provided with an arm 129 having a projection 130 cooperative with a cam 131 secured on shaft 132. Shaft 132 is shown provided with a gear 133 in mesh with a gear 134 secured on shaft 8 (Fig. 1), whereby shaft 132 and cam 131 are rotated. Shaft 124 is provided with an arm 135 having a pin or projection 136 adapted to engage one side of lever 123 to rock said lever in one direction. The pasting roller 121 engages a distributing roller 137 journaled to rotate in a tank 138 supported on the main frame to contain adhesive. A spring 122ᵃ connecting arm 122 with lever 123 keeps roller 121 against roller 137. The shaft of roller 137 has a gear 139 in mesh with a gear 140 upon the shaft of the roller 141 within said tank, engaging roller 137, which shaft has a sprocket 142 receiving a chain 143 passing from a sprocket 144 on shaft 132. When conveyer 2 brings a box body A to rest in position opposite roller 121 the cam 131 will cause operation of arm 129 which, through the action of spring 127 and pin 126 on lever 123 will cause the pasting roller 121 to be advanced into body A in contact with one of its walls to apply adhesive thereto, (see dotted lines in Fig. 27). A finger 145 supported over the conveyer by rail 145ᵃ at station E engages the end of body A to prevent it from being withdrawn from the receiver 3 when the pasting roller 121 is withdrawn from the body by the action of cam 131, (Fig. 27). The withdrawal of roller 121 from box body A is assured by the engagement of pin 136 with lever 123, which acts to positively operate said lever on the return stroke of the pasting roller from the box body. To prevent the operation of pasting roller 121 in case conveyer 2 should come to rest without a box body A opposite the pasting roller a movable stop 146 is presented in front of a pin 147 projecting from lever 123 to obstruct the movement of said lever with the conveyer, (Figs. 25 and 26). Stop 146 is shown pivoted at 148 on rail 149 supported by the main frame, said stop being shown provided with a hook-like end portion 146ᵃ adapted to engage a pin 150 on rail 149 to limit the rise of said stop to normally maintain its end 146ᵃ in the path of pin 147. Stop 146 is held in normal position last stated by means of spring 151 secured to pivot 148 and to said stop, tending normally to raise the stop against pin 150, (Fig. 28). The upper portion of stop 146 is shown curved and adapted to be engaged by box body A on conveyer 2 as said body is brought to rest opposite paster 121, whereby said body will push said stop downward to carry its end 146ᵃ out of the path of pin 147, which then may pass through an opening 149ᵃ in rail 149 to permit lever 123 to advance to insert the paster in body A. When lever 123 returns and body A is moved by the conveyer away from stop 146 the latter will rise to obstruct pin 147 until another box body encounters said stop to depress it to permit operation of lever 123. When pin 147 engages stop 146 the cam 131 may continue to operate arm 129 without injury to the parts, since spring 127 will wind under the rotation of shaft 124 while arm 125 is retained from movement by lever 123 and its pin 147 engaging stop 146. During the last named operation pin 136 will move away from lever 123.

The body A may have end flaps *a*, *b*, *c*, *d*, (Fig. 31), which may be closed by any suitable means, said flaps being at the end of body A opposite insert B, Fig. 32. A movable closer 152 for the side flap *c* and a stationary closer 153 for flap *d* are indicated in Figs. 1 and 3. Closer 152 may be operated in any suitable or well known manner so that when conveyer 2 carries the assembled members A, B, from station Y, said closers will act to close the side flaps *c*, *d*. Flap *b* may be closed by flap closer 154 as the conveyer travels, and paste may be applied to the inner surface of flap *a* by a paster 155 operating in a tank of adhesive 155ᵃ and actuated by any suitable mechanism, such as shown in Fig. 3, pasting device for flaps of cartons being well known in the art. A closer 156 is adapted to engage flap *a* after it has been pasted to press the paste against the outer side of flap *b*. The finished assembled bodies will be delivered from conveyer 2 after the bodies pass roller 11 to be received and distributed in any well known manner. A pusher 157 actuated by cam 158 on shaft 8 through link 159 and push-rod 160 may be used to eject the bodies from the conveyer, (Fig. 3).

The operation may be described as follows:—

The various parts being organized to operate in timed relation, the conveyer 2 and the turret will come to rest at each step of operation, with the corresponding receivers in register. The magazines having been supplied with the collapsed box bodies and the machine being started said bodies will be respectively fed into the receivers of the conveyer and turret and will be opened in the receivers by the corresponding openers 28 and 78. When conveyer 2 brings an opened body A to rest at station X said body will be squeezed or deformed and reformed to its square condition, and when the conveyer brings such body A to rest opposite the pasting devices the paster 121 will enter the body and apply adhesive therein. During the aforesaid operations an insert B will be fed from the turret by finger 95 into the insert squeezing or deforming devices at station Z which will operate to squeeze or deform and reform the insert to its square condition, and such insert next will be fed by finger 96 through guide 92 into the body A then presented on the conveyer adjacent to said guide. Guide 92 being open on the top, will descend from insert B with the descent of support 93, whereby said support will be operated for feeding inserts B and conveyer 2 will carry the assembled body members A, B, away from the position of guide 92 and present another body A in position to receive an insert. The operations as described occur in proper order so that each time the conveyer and the turret come to rest an insert B will be inserted in a body A, and so on, successively.

By means of the mechanism set forth the body members A, B, may be expeditiously assembled in such a manner and of such relative proportions that the insert B may extend beyond body A, (Fig. 32), to receive a detachable cover member (not shown) in a well known manner, such as customary with boxes for pencils, whereby the members A, B, serve as a unit to contain the pencils, and a detachable cover (not shown) may be pulled off and slid upon the portion of insert B extending beyond member A in a well known manner, said two members when united providing the main body of the box.

Changes may be made in the details of construction and relative arrangement of parts set forth, within the scope of the appended claims, without departing from the spirit of the invention. Instead of deforming or squeezing both the outer and inner box members, either of said members may be deformed and reformed without deforming or altering the original characteristics of the other member.

Having now described our invention, what we claim is:

1. A box making machine comprising means to supply collapsed outer and inner box members, means to open said members separately, devices to bring opened outer and inner members into register, and means to insert the inner members into the outer members successively.

2. A box making machine comprising means to supply collapsed outer and inner box members, means to open said members separately, devices to bring opened outer and inner members into register, means to deform and reform one of said members, and means to assemble said members one within the other.

3. A box making machine comprising means to supply collapsed outer and inner box members, means to open said members separately, devices to bring opened outer and inner members into register, means to deform said members in opposite directions and reform said members, and means to assemble said reformed members one within the other.

4. A box making machine comprising means to supply outer and inner box members, devices to deform and reform one of said members, and means to assemble said members one within the other.

5. A box making machine comprising means to supply outer and inner box members, devices to deform and reform said members, and means to assemble said members one within the other.

6. A box making machine comprising means to supply outer and inner box members, devices to deform and reform said members in opposite directions, and means to assemble said reformed members one within another.

7. A box making machine comprising means to supply collapsed outer and inner box members, means to open said members separately, devices to bring opened outer and inner members into register, devices to apply adhesive to a wall of one of said members, to engage the other member, and means to assemble said members one within the other.

8. A box making machine comprising means to supply collapsed outer and inner box members, means to open said members separately, devices to bring opened outer and inner members into register, devices to supply adhesive comprising a member to enter one of said members to apply adhesive to an inner wall thereof, and means to assemble said members one within another.

9. A box making machine comprising means to supply open box members, spring-acting fingers on one side of said box members to bear thereon, positively operated fingers on the opposite side of said box members, and means to move the last named fingers in opposite directions.

10. A box making machine comprising means to supply open box members, spring-acting fingers on one side of said box members to bear thereon, positively operated fingers on the opposite side of said box members, and means to move the last named fingers in opposite directions, and a guide over said box members to engage the latter when moved by said fingers.

11. A box making machine comprising means to supply open box members, spring-acting fingers on one side of said box members to bear thereon, positively operated fingers on the opposite side of said box members, means to move the last named fingers in opposite directions, and a guide over said box members to engage the latter when moved by said fingers, said guide being eccentric to the pivotal point of the box members to aid in reforming them when moved by the fingers in one direction.

12. A box making machine comprising a conveyer having receivers, means to provide open box members in said receivers, fingers on opposite sides of said conveyer to engage said box members, and means to operate said fingers to deform and reform said box members.

13. A box making machine comprising a conveyer having receivers, means to provide open box members in said receivers, fingers on opposite sides of said conveyer to engage said box members, and means to operate said fingers to deform and reform said box members, and a guide over the conveyer to engage the box members when moved by said fingers.

14. A box making machine comprising a conveyer having receivers, means to provide open box members in said receivers, fingers on opposite sides of said conveyer to engage said box members, spring means to actuate the fingers on one side of the box members, and means to positively actuate the other fingers for moving the box members back and forth to deform and reform them.

15. A box making machine comprising a conveyer having receivers, means to provide open box members in said receivers, fingers on opposite sides of said conveyer to engage said box members, spring means to actuate the fingers on one side of the box members, means to positively actuate the other fingers for moving the box members back and forth to deform and reform them, and a guide over the conveyer between said fingers to engage the box members when moved by the fingers.

16. The combination of a conveyer having receivers, means to operate the conveyer step by step, means to supply and open box members in the receivers, a turret having receivers, means to operate the turret step by step, means to supply and open box members in the last named receivers and means to feed the last named box members into the first named box members successively.

17. The combination of a conveyer having receivers, means to operate the conveyer step by step, means to supply and open box members in the receivers, a turret having receivers, means to operate the turret step by step, means to supply and open box members in the last named receivers, members to deform and reform the last named members and means to feed said members from the turret receivers to the deforming members and from the latter to box members on said conveyer.

18. The combination of a conveyer having receivers, means to operate the conveyer step by step, means to supply and open box members in the receivers, a turret having receivers, means to operate the turret step by step, means to supply and open box members in the last named receivers, members to deform and reform the last named members and means to feed said members from the turret receivers to the deforming members and from the latter to box members on said conveyer, and a guide for the box members between the deforming means and the conveyer.

19. The combination of a conveyer having receivers, means to operate the conveyer step by step, means to supply and open box members in the receivers, a turret having receivers, means to operate the turret step by step, means to supply and open box members in the last named receivers, means disposed between the turret and the conveyer to deform and reform the last named members, fingers to feed the members from the conveyer to and from the deforming means, and means to operate said fingers when the conveyer and turret are at rest.

20. The combination of a conveyer having receivers, means to operate the conveyer step by step, means to supply and open box members in the receivers, a turret having receivers, means to operate the turret step by step, means to supply and open box members in the last named receivers, means disposed between the turret and the conveyer to deform and reform the last named members, fingers to feed the members from the conveyer to and from the deforming means, means to operate said fingers when the conveyer and turret are at rest, and a guide between said deforming means and the conveyer to guide said members fed from the deforming means, and means to operate the guide with said fingers.

21. The combination of a conveyer having receivers, means to operate the conveyer step by step, means to supply and open box members in the receivers, a turret having receivers, means to operate the turret step by step, means to supply and open box members in the last named receivers, deforming means for the last named members between the turret and the conveyer, means to operate the deforming means, fingers to feed members from the turret to and from the deforming means to assemble said members with members on the conveyer, a support for said fingers, a guide carried by the support between the turret and the conveyer, means to move the support with the fingers and guide toward and from the deforming means, and means to reciprocate the fingers relatively to said support.

22. The combination of a conveyer having receivers, means to operate the conveyer step by step, means to supply and open box members in the receivers, a turret having receivers, means to operate the turret step by step, means to supply and open box members in the last named receivers, a member pivotally supported to bear on one side of the box members and a member pivotally supported to bear against adjacent sides of box members, said pivotal members being pivotally connected together, means to actuate one of said members in opposite directions, resilient means to actuate the other member, and means to feed box members to and from said deforming means.

23. The combination of a conveyer having receivers, means to supply the receivers with open box members, a paster to enter the box members, means to supply the paster with adhesive, means to operate the paster, and means to prevent operation of the paster in the absence of a box member in position to receive the paster.

24. The combination of a conveyer having receivers, means to supply the receivers with open box members, a paster to enter the box members, means to supply the paster with adhesive, means to operate the paster, and a stop movably supported to oppose the entrance of the paster into box members, said stop being in the path of the box members to be actuated thereby to remove the stop from opposition to the operation of the paster.

25. The combination of a conveyer having receivers, means to supply the receivers with open box members, a paster to enter the box members, means to supply the paster with adhesive, an arm carrying the paster, resiliently acting means to operate the arm, a stop to obstruct the entrance of the paster into the box members, and means movably supporting said stop in the path of the box members to be operated by the latter to remove the stop as an obstruction to the paster.

26. The combination of a conveyer having receivers, means to supply the receivers with open box members, a paster to enter the box members, means to supply the paster with adhesive, an arm carrying the paster, a shaft carrying said arm, a pin movable relatively to the shaft connected with said arm, a spring connecting said pin and shaft, a cam, and means operated by the cam for actuating said shaft and the pin through said spring, and a stop movably supported in the path of the box members to be moved thereby out of position to obstruct said arm.

27. The combination of a conveyer having receivers, means to supply the receivers with open box members, a paster to enter the box members, means to supply the paster with adhesive, an arm carrying the paster, a shaft carrying said arm, a pin movable relatively to the shaft connected with said arm, a spring connecting said pin and shaft, a cam, and means operative by the cam for actuating said shaft and the pin through said spring, and a stop movably supported in the path of the box members to be moved thereby out of position to obstruct said arm, and means connected with said shaft to positively operate said arm to withdraw the paster from the box member.

Signed at New York, county of New York, and State of New York, this 5th day of May, 1921.

ERNEST D. ANDERSON.
CARL BECKMANN.